United States Patent [19]

Peng

[11] Patent Number: 5,073,088
[45] Date of Patent: Dec. 17, 1991

[54] GRILL ASSEMBLY FOR PORTABLE FAN

[75] Inventor: Johnson Peng, Taipei, Taiwan

[73] Assignee: Duracraft Corporation, Sudbury, Mass.

[21] Appl. No.: 645,727

[22] Filed: Jan. 25, 1991

[51] Int. Cl.$^5$ ............................................. F01D 25/28
[52] U.S. Cl. .................................. 416/247 R; 24/453; 403/338
[58] Field of Search ..................... 416/247 R; 403/338, 403/335; 24/453, 460, 297

[56] References Cited

U.S. PATENT DOCUMENTS

| D. 309,944 | 8/1990 | Chiu | D23/382 |
| 3,963,382 | 6/1976 | Patton | 416/247 R |
| 4,566,660 | 1/1986 | Anscher et al. | 24/453 |
| 4,840,334 | 1/1989 | Kikuchi | 24/453 |
| 4,943,183 | 7/1990 | Nakano | 24/297 |

*Primary Examiner*—John T. Kwon
*Attorney, Agent, or Firm*—John E. Toupal; Harold G. Jarcho

[57] ABSTRACT

An environmental conditioning apparatus including a control unit for conditioning a surrounding environment; a housing retaining the conditioning unit and comprising a flange defining an opening, the flange having inner and outer flange edge portions separated by oppositely directed front and rear flange surface portions; and a grill covering the opening and comprising a rim juxtaposed to the flange, the rim having inner and outer rim edge portions separated by oppositely directed front and rear rim surface portions and the rear rim surface portion facing the front flange surface portion. Also included are a plurality of fastening elements securing the rim to the flange; each of the elements being U-shaped and having an inner leg portion extending over the inner rim and flange edge portions, an outer leg portion extending over the outer rim and flange edge portions, a web portion joining the inner and outer leg portions and engaging either the front rim surface portion or the rear flange surface portion, and a latch portion terminating one of the leg portions and engaging the other front rim surface portion or rear flange surface portion not engaged by the web portion. The fastening elements facilitate assembly and disassembly of the grill.

23 Claims, 2 Drawing Sheets

GRILL ASSEMBLY FOR PORTABLE FAN

BACKGROUND OF THE INVENTION

This invention relates generally to a portable fan device and, more particularly, to a portable fan device with an improved demountable protective grill assembly.

Many environmental conditioning devices utilize fan blades to produce air movement. Typically, such devices include protective grills that permit substantially unimpeded air flow while preventing potentially injurious physical contact with the fan blades employed. For ease of manufacturing, shipping and storage, protective grills often are discrete assemblies removably attachable to the operating unit.

Prior detachable grill assemblies have exhibited individually and collectively a variety of disadvantages. For example, certain types of connectors such as preassembled riveted hinges and closure rings are not easily replaceable after breakage thereby rendering unsafe the units on which they are used. Other devices have protective grills attached with clips that require specially designed tools for removal. Still other securing elements are either costly to manufacture or cumbersome to assemble.

The object of this invention, therefore, is to provide for a fan device an improved attachment system for a removable protective grill.

SUMMARY OF THE INVENTION

The invention is an environmental conditioning apparatus including a control unit for conditioning a surrounding environment; a housing retaining the conditioning unit and comprising a flange defining an opening, the flange having inner and outer flange edge portions separated by oppositely directed front and rear flange surface portions; and a grill covering the opening and comprising a rim juxtaposed to the flange, the rim having inner and outer rim edge portions separated by oppositely directed front and rear rim surface portions and the rear rim surface portion facing the front flange surface portion. Also included are a plurality of fastening elements securing the rim to the flange; each of the elements being U-shaped and having an inner leg portion extending over the inner rim and flange edge portions, an outer leg portion extending over the outer rim and flange edge portions, a web portion joining the inner and outer leg portions and engaging either the front rim surface portion or the rear flange surface portion, and a latch portion terminating one of the leg portions and engaging the other front rim surface portion or rear flange surface portion not engaged by the web portion. The fastening elements facilitate assembly and disassembly of the grill.

According to one feature of the invention, the latch portion terminates the outer leg portion and projects transversely therefrom toward the inner leg portion, the outer leg portion is resilient, and the spacing between the latch portion and the inner leg portion is less than the width of the other of either the front rim surface portion or the rear flange surface portion so as to require flexing of the outer leg portion during movement of the latch portion by either the rim or flange defining the other surface portion. Because of this feature the latch portions are accessible externally of the grill so as to facilitate removal of the fastening elements without a requirement for special tools.

According to another feature of the invention, the latch portion comprises a hook having a cam surface tapered inwardly toward the inner leg portion and downwardly toward the web portion. The cam surface generates forces required to flex the outer leg portion.

According to yet another feature of the invention, the fastening elements include spacer portions extending inwardly from at least one of the inner or outer leg portions and disposed to project between the inner rim surface portion and the outer flange surface portion. The spacer portions physically isolate the rim from the flange so as to prevent vibrating engagement therebetween.

According to still another feature of the invention, the grill comprises a plurality of spaced apart ribs having interconnected inner ends and outer ends joined to the rim and each of the fastening elements comprises a retainer portion projecting from the web portion and defining a pair of spaced apart sockets, one disposed to receive one of the ribs and another disposed to receive another rib directly adjacent to the one rib. The socketed retainer portion insures stable retention of the fastening elements on the ribbed grill.

According to further features of the invention, the sockets define entrances adapted to press fittedly receive the ribs, and the spacing between the directly adjacent ribs increases in a direction from the inner ends to the outer ends. These structural features simplify assembly of the fastening elements and insure against inadvertent dislodgement thereof.

According to a further feature of the invention, each of the fastening elements is an integrally molded plastic unit. This feature permits the elements to provide the desired functions with minimum production costs.

DESCRIPTION OF THE DRAWINGS

These and other objects and features of the invention will become more apparent upon a perusal of the following description taken in conjunction with the accompanying drawings wherein.

DESCRIPTION OF THE PREFERRED EMBODIMENTS

Figure 1:
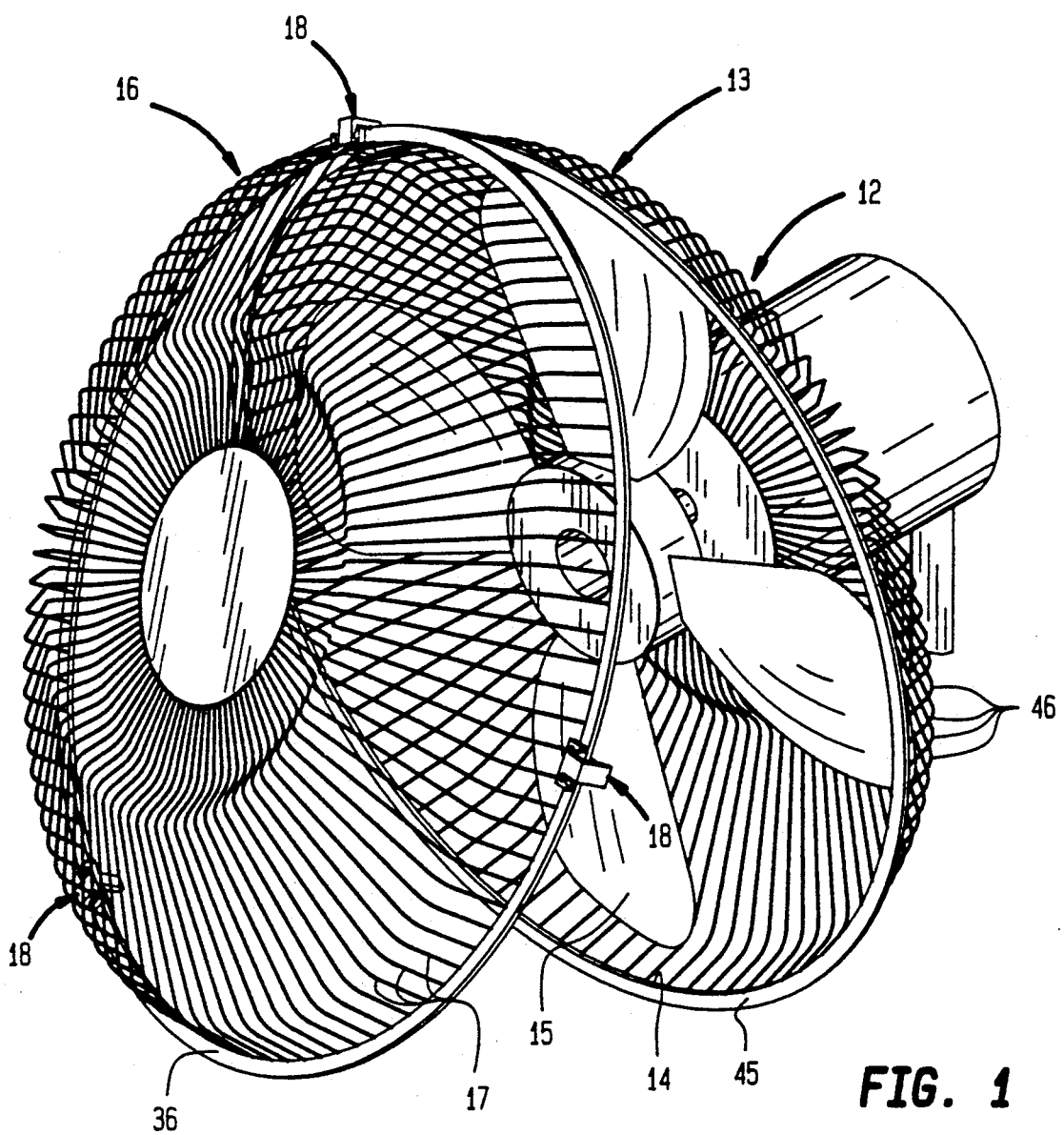
FIG. 1 is a perspective view of a fan device according to the invention.

A portable fan 11 can be used as an environmental conditioner by circulating air within a surrounding environment. Included in the fan 11 is a housing assembly 12 that includes a cage 13 that defines an opening 14. A fan blade 15 is disposed within the cage 13 and is accessible through the opening 14. Closing the opening 14 is a removable grill 16 formed by a plurality of radially oriented ribs 17. The grill 16 is removably attached to the cage 13 by a plurality of circumferentially distributed fastening clips 18 as described hereinafter.

Figure 2:
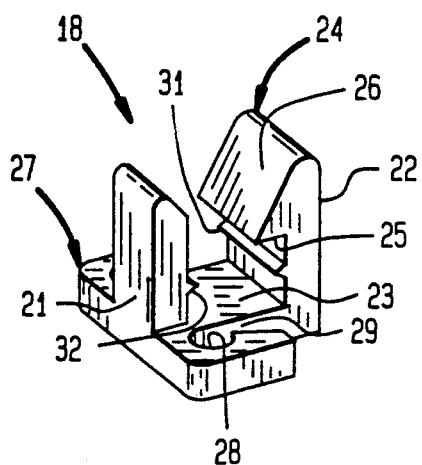
FIG. 2 is a perspective view of a clip element used in the device shown in FIG. 1.

As shown in FIG. 2 the clip 18 is a U-shaped element having parallel, spaced apart inner and outer leg portions 21, 22 connected at their ends by a web portion 23. Terminating an opposite end of the outer leg portion 22 is a latch portion 24 projecting transversely toward the inner leg portion 21 so as to form an engagement surface 25. A cam surface portion 26 of the latch portion 24 tapers inwardly from the outer leg portion 22 toward the inner leg portion 21 and downwardly toward the web portion 23. Extending outwardly from the web portion 23 is a retainer portion 27 that forms on each side of the inner leg portion 21 a socket 28 having an entrance opening 29. An elongated tab 31 is formed on an inner surface of the outer leg portion 22 and extends parallel to and spaced from the web portion 23. Similarly, an elongated tab 32 is formed on the inner surface of the inner leg portion 21 and extends parallel to and spaced from the web portion 23. Preferably, the clip 18 is a discrete unit integrally molded with a plastic material providing resiliency for the outer leg portion 22.

Figure 3:
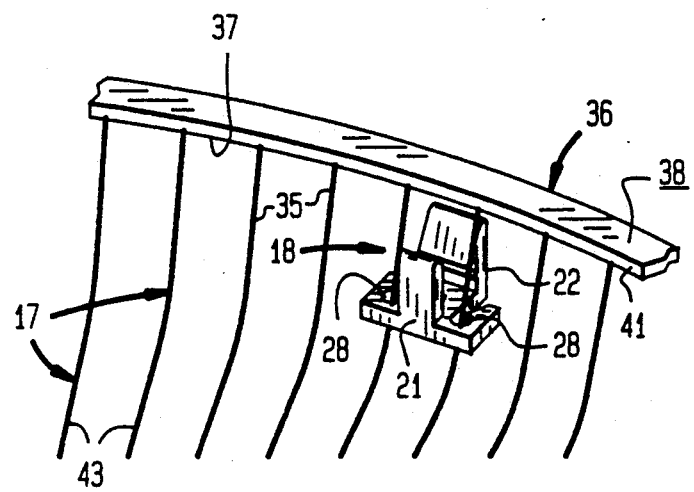
FIG. 3 is a perspective view illustrating one step in the assembly of the clip element shown in FIG. 2.
Figure 4:
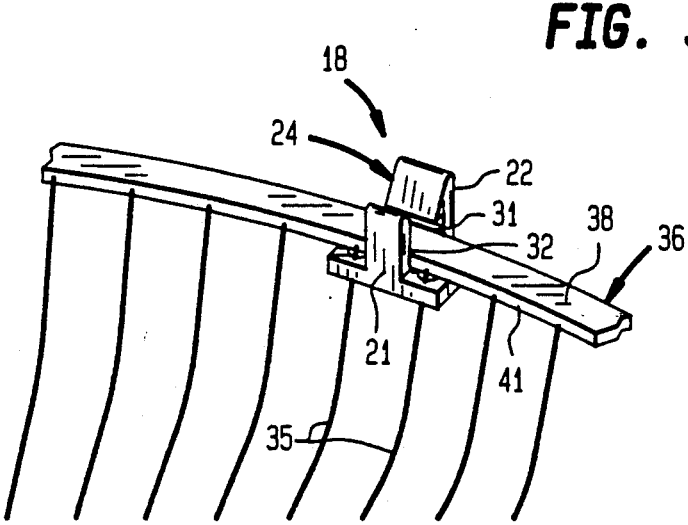
FIG. 4 is a perspective view illustrating another step in the assembly of the clip element shown in FIG. 2.
Figure 5:
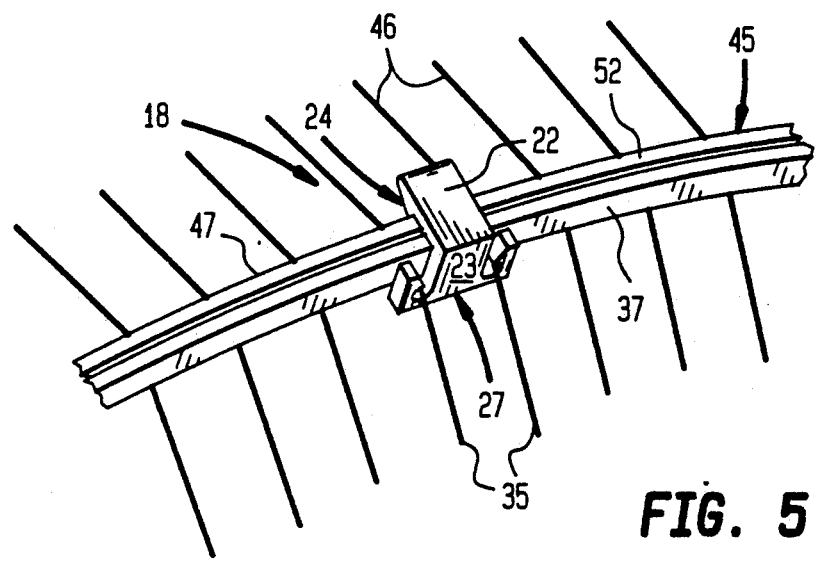
FIG. 5 is a perspective view illustrating the clip element of FIG. 2 in fully assembled position.

Prior to attachment of the grill 16 over the opening 14 in the cage 13, the clips 18 are first assembled on the grill 16 as illustrated in FIGS. 3 and 4. Each of the clips 18 is attached to outer portions 35 of a directly adjacent pair of the ribs 17. As shown in FIG. 3, the outer rib portions 35 are connected to and extend substantially perpendicular to a circular rim 36 having a planar rim front surface 37 and a planar rim rear surface 38 that extend between an inner rim edge 41 and an outer rim edge 42. Opposite ends of the outer portions 35 join inner rib portions 43 that extend radially inwardly from the rim 36.

During assembly of a clip element 18, a pair of directly adjacent outer rib portions 35 are press fitted through the entrance openings 29 into the sockets 28 (FIG. 3). The element 18 then is slid into the position shown in FIG. 4 with the inner leg portion 21 and outer leg portion 22 straddling the rim 36 and the web portion 23 engaging the front rim surface 37. During this positioning of the clip element 18, the outer cam surface 26 on the latch portion 24 engages the outer rim edge 42 and flexes the resilient outer leg portion 22 outwardly to provide the necessary clearance for the latch portion 24 which is spaced from the inner leg portion 21 by a distance less than the width W of the rim 36. In addition, the elongated tabs 31, 32 which also are spaced apart by less than the width W must be forced by the inner and outer rim edges 41, 42.

Figure 6:
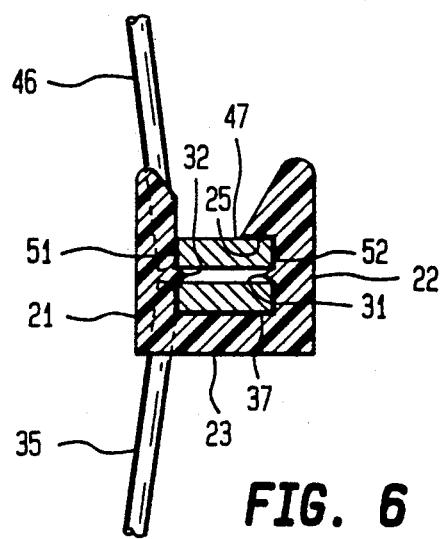
FIG. 6 is a cross-sectional view taken along lines 6—6 of FIG. 5.
Figure 7:
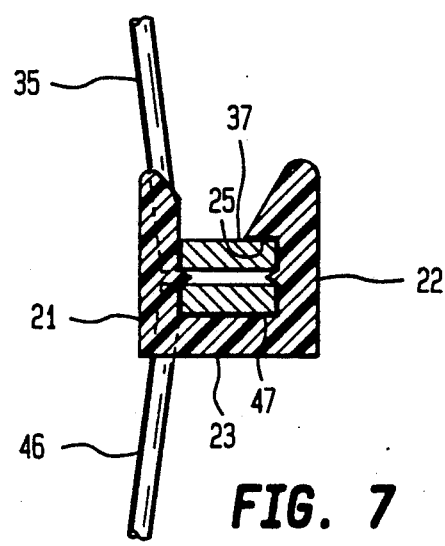
FIG. 7 is a cross-sectional view similar to that shown in FIG. 6 but of another invention embodiment.

After positioning the clip elements 18 in the manner described above, the grill 16 is attached to the cage 13 with the circular rim 36 juxtaposed to a conforming circular flange 45 that is attached to ends of radially directed spokes 46. The flange 45 includes a planar rear flange surface 47 and a planar front flange surface 48 that extend between an inner flange edge 51 and an outer flange edge 52. Assembly is accomplished by forcing the clip elements 18 over the flange 15 into the positions wherein the inner leg portion 21 engages the inner rim edge 41 and the inner flange edge 51, the outer leg portion 22 engages the outer rim edge 42 and the outer flange edge 52, and the engagement surface 25 on the latch portion 24 engages the rear flange surface 47 (FIG. 6). During this assembly operation, the outer leg portion 22 is again flexed outwardly by engagement between the cam surface 26 of the latch portion 24 and the outer flange edge 52 of the flange 45 which also has a width W. The elongated tabs 31, 32, however, remain in positions between the front flange surface 28 and rear rim surface 38 so as to maintain a physical separation between the rim 36 and the flange 45. That separation prevents undesirable vibratory noise that could be generated by engagement between the rim 36 and the flange 45.

Disassembly of the grill 16 from the cage 13 is accomplished in the following manner. The outer leg portion 22 of each clip element 18 first is flexed outwardly to move the latch portion 24 outside the flange 45. This operation is readily accomplished in that the latch portions 24 are located outside the cage 13 so as to be readily accessible. The clip element 18 then is moved inwardly on the outer rib portions 35 into the position shown in FIG. 3 and out of engagement with the flange 45. This completely detaches the rim 36 from the flange 47 and allows separation of the grill 16 from the cage 13. Excessive movement of the clip element 18 on the ribs 17 is prevented by an outwardly decreasing spacing between the outer rib portions 35. As shown in FIG. 4, the spacing D closely adjacent to the rim 36 is such as to closely accommodate the spacing between the sockets 28. However, the lesser spacing d a given distance from the rim 36 is less than the spacing D between the sockets 28 and thereby limits movement of the clip element 18.

FIG. 6 illustrates another embodiment 61 of the invention in which the positions of the clip elements 18 are reversed. In the embodiment 61, the clip elements first are assembled on the flange 45 and then pressed over the rim 36. Thus, the web portion 23 engages the rear flange surface 47 rather than the front rim surface 37 and the engagement surface 25 of the latch portion 24 engages the front rim surface 37 rather than the rear flange surface 47. In other ways the clips elements 18 function in the manner described above to secure the grill 16 to the cage 13.

Obviously, many modifications and variations of the present invention are possible in light of the above teachings. It is to be understood, therefore, that the invention can be practiced otherwise than as specifically described.

What is claimed is:

1. Environmental conditioning apparatus comprising:
    conditioning means for conditioning a surrounding environment;
    housing means retaining said conditioning means and comprising a flange means defining an opening, said flange means having inner and outer flange edge portions separated by oppositely directed front and rear flange surface portions;
    grill means covering said opening and comprising a rim means juxtaposed to said flange means, said rim means having inner and outer rim edge portions separated by oppositely directed front and rear rim surface portions and said rear rim surface portion facing said front flange surface portion; and
    a plurality of fastening elements securing said rim means to said flange means; each of said elements being U-shaped and having an inner leg portion extending over said inner rim and flange edge portions, an outer leg portion extending over said outer rim and flange edge portions, a web portion joining said inner and outer leg portions and engaging one of said front rim surface portion or said rear flange surface portion, and a latch portion terminating one of said inner or outer leg portions and engaging the other said front rim surface portion or rear flange surface portion not engaged by said web portion.

2. An apparatus according to claim 1 wherein said latch portion terminates said outer leg portion and projects transversely therefrom toward said inner leg portion.

3. An apparatus according to claim 2 wherein said outer leg portion is resilient and the spacing between said latch portion and said inner leg portion is less than the width of said other said front rim surface portion or rear flange surface portion so as to require flexing of said outer leg portion during movement of said latch portion by said rim or flange means defining said other surface portion.

4. An apparatus according to claim 3 wherein said other surface portion is said rear flange surface portion.

5. An apparatus according to claim 3 wherein said latch portion comprises a hook having a cam surface tapered inwardly toward said inner leg portion and downwardly toward said web portion.

6. An apparatus according to claim 1 wherein each of said elements includes spacer portion means extending inwardly from at least one of said inner or outer leg portions and disposed to project between said inner rim surface portion and said outer flange surface portion.

7. An apparatus according to claim 6 wherein said spacer portion means comprises an inner tab portion extending from said inner leg portion toward said outer leg portion and an outer tab portion extending from said outer leg portion toward said inner leg portion.

8. An apparatus according to claim 7 wherein said latch portion terminates said outer leg portion and projects transversely therefrom toward said inner leg portion.

9. An apparatus according to claim 8 wherein said outer leg portion is resilient and the spacing between said latch portion and said inner leg portion is less than the width of said other said front rim surface portion or rear flange surface portion so as to require flexing of said outer leg portion during movement of said latch portion by said rim or flange means defining said other surface portion.

10. An apparatus according to claim 9 wherein said other surface portion is said rear flange surface portion.

11. An apparatus according to claim 10 wherein said latch portion comprises a hook having a cam surface tapered inwardly toward said inner leg portion and downwardly toward said web portion.

12. An apparatus according to claim 1 wherein said grill means comprises a plurality of spaced apart ribs having interconnected inner ends and outer ends joined to said rim means, each of said elements comprises a retainer portion projecting from said web portion and defining a pair of spaced apart sockets, one disposed to receive one of said ribs and another disposed to receive another rib directly adjacent to said one rib.

13. An apparatus according to claim 12 wherein said sockets define entrances adapted to press fittedly receive said ribs.

14. An apparatus according to claim 13 wherein the spacing between said directly adjacent ribs increases in a direction from said inner ends to said outer ends.

15. An apparatus according to claim 14 wherein said latch portion terminates said outer leg portion and projects transversely therefrom toward said inner leg portion.

16. An apparatus according to claim 15 wherein said outer leg portion is resilient and the spacing between said latch portion and said inner leg portion is less than the width of said other said front rim surface portion or rear flange surface portion so as to require flexing of said outer leg portion during movement of said latch portion by said rim or flange means defining said other surface portion.

17. An apparatus according to claim 16 wherein said other surface portion is said rear flange surface portion.

18. An apparatus according to claim 17 wherein said latch portion comprises a hook having a cam surface tapered inwardly toward said inner leg portion and downwardly toward said web portion.

19. An apparatus according to claim 18 wherein each of said elements includes spacer portion means extending inwardly from at least one of said inner and outer portions and disposed to project between said inner rim surface portion and said outer flange surface portion.

20. An apparatus according to claim 19 wherein said spacer portion means comprises an inner tab portion extending from said inner leg portion toward said outer leg portion and an outer tab portion extending from said outer leg portion toward said inner leg portion.

21. An apparatus according to claim 20 wherein said rim means comprises a circular rim, and said ribs include inner portions extending radially to said rim and outer portions extending substantially perpendicular thereto.

22. An apparatus according to claim 1 wherein said conditioning means comprises a fan blade, said rim means is a circular rim, and said flange means is a circular flange substantially conforming to said rim.

23. An apparatus according to claim 1 wherein each of said elements is an integrally molded plastic unit.

* * * * *